United States Patent [19]

Machado

[11] Patent Number: 4,969,939
[45] Date of Patent: Nov. 13, 1990

[54] HEAVY DUTY AIR FILTER WITH INTEGRAL SNOW VALVE

[75] Inventor: Joseph Machado, Attleboro, Mass.

[73] Assignee: Allied-Signal Inc., Morristown, N.J.

[21] Appl. No.: 415,839

[22] Filed: Oct. 2, 1989

[51] Int. Cl.⁵ ............................................. B01D 51/00
[52] U.S. Cl. ........................................ 55/419; 55/498; 123/198 E
[58] Field of Search ............... 55/419, 498; 123/198 E

[56] References Cited

U.S. PATENT DOCUMENTS

| | | | |
|---|---|---|---|
| 2,788,086 | 4/1957 | Sebok | 55/419 |
| 3,394,687 | 7/1968 | Scott | 55/419 |
| 3,452,521 | 7/1969 | Remacle | 55/419 |
| 3,513,817 | 5/1970 | Kearsley | 55/419 |
| 4,058,099 | 11/1977 | Saito | 123/198 E |
| 4,197,101 | 4/1980 | Cote, Jr. et al. | 55/419 |
| 4,215,665 | 8/1980 | Stambaugh | 123/198 E |
| 4,327,680 | 5/1982 | Dauwalder | 123/195 C |

FOREIGN PATENT DOCUMENTS

| | | | |
|---|---|---|---|
| 2737307 | 2/1978 | Fed. Rep. of Germany | 55/419 |
| 2709004 | 9/1978 | Fed. Rep. of Germany | 55/419 |

*Primary Examiner*—Jay H. Woo
*Assistant Examiner*—C. Scott Bushey
*Attorney, Agent, or Firm*—Ken C. Decker; William N. Antonis

[57] ABSTRACT

An air cleaner assembly for a motor vehicle includes a housing which carries a substantially flat valve cover plate which defines a pair of openings. A valve is slidable relative to the valve cover plate through a linkage operated from the vehicle operator's compartment to cover one or the other of the openings in the valve cover plate. During normal operation of the vehicle, combustion air is communicated to the air cleaner housing through the normal air induction system. However, when heavy snow blocks communication through the normal air induction system, the vehicle operator operates the linkage to move the valve to a position opening the other opening into the air cleaner, so that underhood air may be used for combustion as long as the normal air induction system is blocked by snow.

9 Claims, 2 Drawing Sheets

HEAVY DUTY AIR FILTER WITH INTEGRAL SNOW VALVE

This invention relates to an air cleaner assembly for a heavy duty vehicle which includes an integral snow valve.

BACKGROUND OF THE INVENTION

Heavy equipment, such as highway maintenance trucks and other vehicles used where heavy snows are common often are subjected to clogging of the vehicle engine air intake system with snow. Such clogging results in poor engine performance, and often makes the engine completely inoperable. Accordingly, it has become common in such vehicles to provide a valve which switches the inlet of the vehicle engine air cleaner from the normal air intake system to underhood air during such heavy snow conditions. However, prior art air intake systems from such vehicles mounted the snow valve separate from the air cleaner, and it was often difficult to easily switch the snow valve from the normal air induction system to the underhood air intake. Furthermore, such remote snow valves were also undesirable because they added cost to the system, and were often inconvenient to package in the space available.

SUMMARY OF THE INVENTION

The present invention incorporates a snow valve integral with the air cleaner housing. The snow valve is capable of switching between the normal air intake system and underhood air under snow clogging conditions, but does not appreciably change the contour of the air cleaner itself. Accordingly, the air cleaner with the integral snow valve pursuant to the present invention may be packaged anywhere a conventional air cleaner may be packaged. Furthermore, the snow valve may be easily operated, through a cable connection with the vehicle operator's compartment, to switch the snow valve from the normal condition in which air inducted through the normal air intake system is used to using underhood air under snow clogging conditions.

BRIEF DESCRIPTION OF THE DRAWINGS

These and other advantages of the invention will become apparent from the following description, with reference to the accompanying drawings, in which.

DESCRIPTION OF PREFERRED EMBODIMENT

Figure 1:
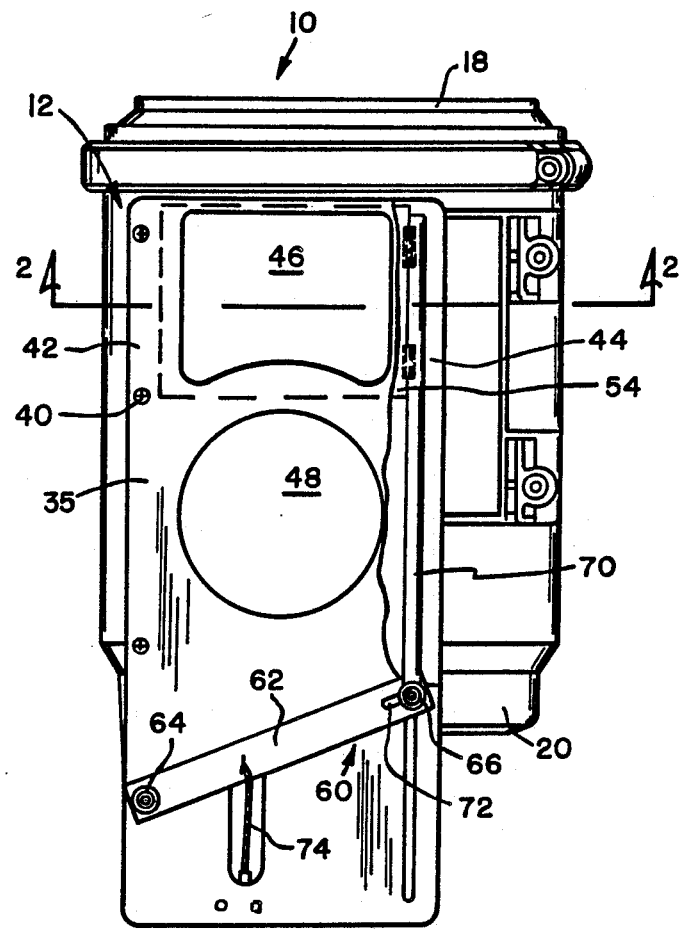
FIG. 1 is a top plan view of an air cleaner with an integral snow valve made pursuant to the teachings of the present invention.
Figure 2:
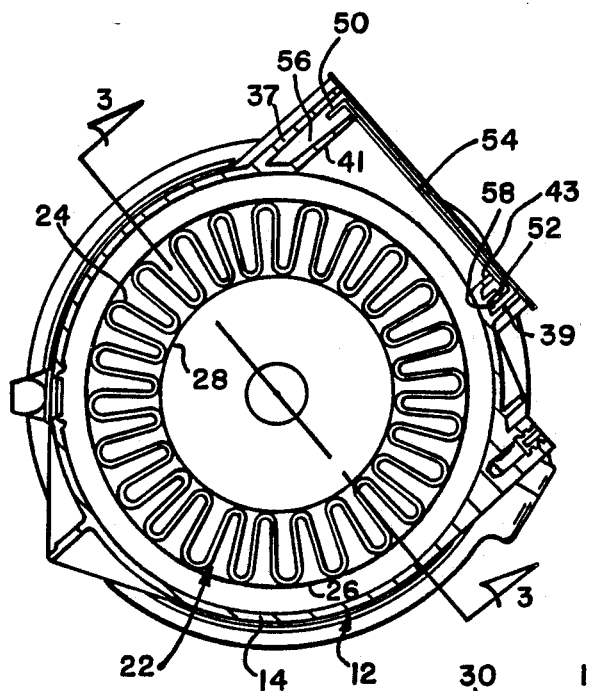
FIG. 2 is a transverse cross-sectional view taken substantially along lines 2—2 of FIG. 1.
Figure 3:
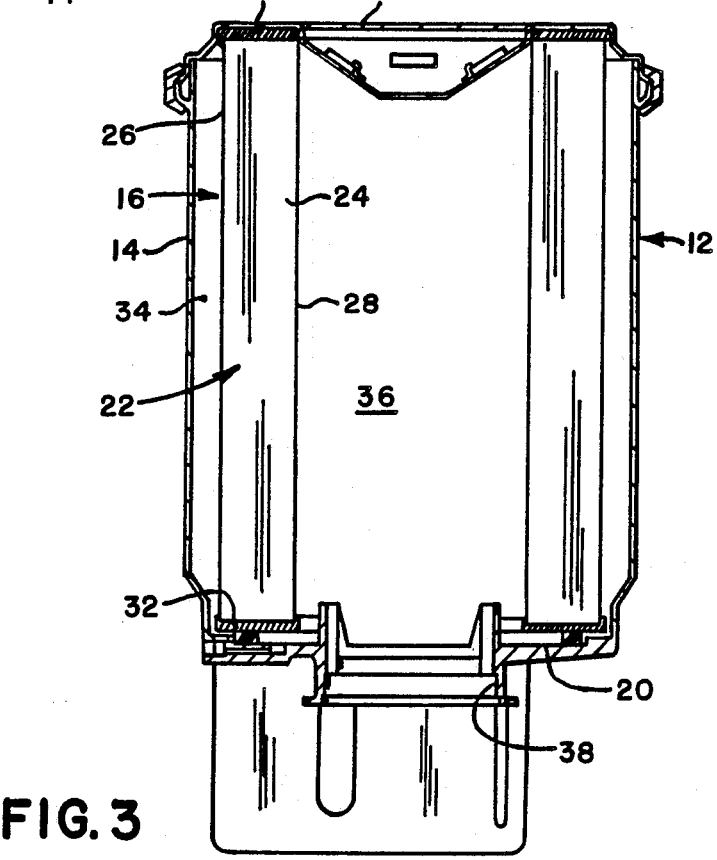
FIG. 3 is a cross-sectional view taken substantially along lines 3—3 of FIG. 2.

Referring now to the drawings, an air cleaner generally indicated by the numeral 10 includes a housing 12 having a circumferentially extending outer wall 14 defining a chamber 16 therewithin. A pair of transversely extending end walls 18, 20 close opposite ends of the chamber 16. A filtering cartridge generally indicated by the numeral 22 is received within the chamber 16, and includes a conventional pleated paper filtering medium 24 consisting of a circumferentially extending array of radially tapering pleats. An outer screen 26 and inner screen 28 circumscribe the media 24 to provide radial support of the latter. Upper and lower sealing end caps 30, 32 circumscribe the medium 24 and provide sealing engagement with the corresponding end cap 18, 20. The outer screen 26 defines the upstream side of the cartridge, and cooperates with the wall 14 to divide the chamber 16 into inlet section generally indicated by the numeral 34. The inner screen 28 defines the downstream side of the cartridge 22 and defines an outlet chamber 36. Outlet chamber 36 communicates with an outlet opening 38 defined on end wall 20.

A substantially flat valve cover plate 35 is mounted on circumferentially spaced, projecting legs 37, 39 extending from the circumferentially extending wall 14 to define a substantially flat mounting surface. Valve cover plate 35 is secured to the legs 37, 39 by screws 40 extending through opposite edges 42, 44 of the valve cover plate 35 into the legs 37, 39. A pair of inlet openings 46, 48 are defined in the valve cover plate 35. Normally, the air cleaner 10 is mounted in the engine compartment with the valve cover plate 35 extending directly beneath the hood (not shown) of the vehicle. The normal air induction system of the vehicle consists of an inlet air duct which extends through the hood of the vehicle and, when the hood is closed, sealingly engages with the opening 48 to communicate ambient air from outside of the engine compartment to the opening 48. The opening 46 is open to the air within the vehicle engine compartment. Projections 50, 52 project from opposite edges of a valve generally indicated by the numeral 54. Projections 50, 52 are slidably received in tracks 56, 58 defined between the legs 37, 41 and the legs 39, 43. Accordingly, the valve 54 is supported by the legs 41, 43 and guided by the tracks 56, 58 for sliding movement relative to the plate 35. The valve 54 is supported between the valve cover plate 35 and the legs 37, 39, and, since the legs 37, 39 are substantially parallel to the axis defined by the cartridge 22, the valve 54 also moves substantially coaxial with the cartridge 22.

Movement of the valve 54 between the first position in which the underhood air inlet 46 is covered and air is communicated into the housing 12 through the outside air inlet 48 and a second position in which the outside air inlet is covered and the underhood air inlet 46 is opened is effected by a linkage assembly generally indicated by the numeral 60. Linkage 60 includes a lever 62 which is pivotedly mounted on valve cover plate 35 by a first pivot 64. A second pivot 66 is provided at a turned-up end of rod 70. Elongated slot 72 provided in lever 62 prevents rod 70 from binding during pivoting of lever 62. Rod 70 is attached to valve 54 by welding. Pivoting of the lever 62 is effected through a cable 74, which connects the lever 62 with an operating lever (not shown) in the vehicle operators compartment.

As discussed above, when the air cleaner 10 is mounted on the vehicle, the valve cover plate 35 is immediately below the hood of the vehicle, and extends roughly parallel thereto. The normal air induction system, consisting of a series of conduits, extends through the hood to communicate with the opening 48 in the valve cover plate 35. Normally, a circumferentially extending "donut" of elastic material is mounted on the inside of the hood circumscribing the opening of the air induction system through the hood. When the hood is closed, this donut of sealing material sealing engages the portion of the valve cover plate 35 circumscribing the opening 48, to thereby provide a substantially air tight connection between the air induction system extending through the vehicle hood and the opening 48. During normal operation of the vehicle, ambient air is communicated through the opening 48 into the chamber 16, where it is cleaned by the filtering element 22 before passing into the outlet chamber 36 defined by inner screen 28 and outlet opening 38 defined in the end wall 20, from where it is communicated to the induction manifold of the vehicle engine.

However, when vehicles are operated in heavy snow areas, the normal air induction system sometimes becomes clogged with snow, thereby rendering the vehicle partially or wholly inoperable because the engine is starved for combustion air. When this occurs, the vehicle operator may move the aforementioned lever (not shown) in the vehicle operator's compartment, which is connected by cable 74 to the lever 62, moving the lever 62 clockwise viewing FIG. 1, thereby forcing the valve 54 from its normal position covering the inlet 46 to a position covering the inlet 48 and opening the inlet 46. Since the inlet 46 is open to underhood air, the engine may be started and is able to run. Of course, it is desirable to use the ambient air communicated through opening 48 when possible, since this air is cooler and therefore more dense, so that the engine runs more efficiently. However, the ability of the valve 54 to open the inlet 46 to use the underhood air permits the vehicle to be started and operated in the event that snow clogs the inlet air conduits communicated with opening 48.

I claim:

1. Air cleaner assembly for a motor vehicle comprising a housing, said housing having a circumferentially extending wall defining a chamber therewithin and a pair of end walls extending transversely with respect to the circumferentially extending wall and closing opposite ends of said chamber, a filtering cartridge received within said chamber, said filtering cartridge having an upstream side and a downstream side, an outlet opening defined in one of said end walls communicating with the downstream side of said filtering cartridge, and a pair of inlet openings defined on the circumferentially extending wall, each of said inlet openings communicating with the upstream side of said filtering cartridge, a valve slidably mounted on said circumferentially extending wall for movement from a first position covering one of said inlet openings to a second positioncovering one of said inlet openings to a second position coverby the vehicle operator for moving said valve between the first and second positions, said inlet openings being defined on a valve cover plate mounted on said circumferentially extending wall, said valve being mounted for sliding movement relative to said valve cover plate.

2. Air cleaner assembly as claimed in claim 1, wherein supporting legs project from said circumferentially extending wall to define a mounting surfce, said valve cover plate having a pair of opposite edges, said opposite edges being supported by said supporting legs, said inlet openings being apertures formed in said valve cover plate.

3. Air cleaner assembly as claimed in claim 1, wherein said legs define guiding tracks for guiding said valve for movement along said vlave cover plate, said valve cover plate including a pair of projections cooperating with a corresponding one of said tracks.

4. Air cleaner assembly as claimed in claim 3, wherein said tracks extend parallel to the axis of said housing defined by said circumferentially extending wall for guiding movement of said valve in a direction substantially parallel to said axis.

5. Air cleaner assembly as claimed in claim 3, wherein said linkage means includes a lever, first pivot means mounting said lever for pivoting relative to said housing, a rod, second pivot means pivotally connecting one end of the rod to said lever, and control means manipulatable by the vehicle operator for pivoting said lever.

6. Air cleaner assembly as claimed in claim 5, wherein said first pivot means mounts said lever on said valve cover plate for pivoting relative thereto.

7. Air cleaner assembly as claimed in claim 3, wherein said valve slides between said valve cover plate and said legs.

8. Air cleaner assembly as claimed in claim 3, wherein both said valve cover plate and said valve are substantially flat.

9. Air cleaner assembly for a motor vehicle comprising a housing, said housing having a circumferentially extending wall defining a chamber therewithin and a pair of end walls extending transversely with respect to the circumferentially extending wall and closing opposite ends of said chamber, a filtering cartridge received within said chamber, said filtering cartridge having an upstream side and a downstream side, an outlet opening defined in one of said end walls communicating with the downstream side of said filtering cartridge, and a pair of inlet openings defined on the circumferentially extending wall, each of said inlet openings communicating with the upstream side of said filtering cartridge, a valve slidably mounted on said circumferentially extending wall for movement from a first position covering one of said inlet openings to a second position covering the other inlet opening, and linkage means operable by the vehicle operator for moving said plate between the first and second positions, said linkage means includes a lever, first pivot means mounting said lever for pivoting relative to said housing, a rod, second pivot means pivotally connecting one end of the rod to said lever, and control means manipulatable by the vehicle operator for pivoting said lever.

* * * * *